United States Patent
Yang

(10) Patent No.: US 12,349,142 B2
(45) Date of Patent: Jul. 1, 2025

(54) METHOD AND DEVICE FOR DATA TRANSMISSION

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 757 days.

(21) Appl. No.: 17/635,682

(22) PCT Filed: Aug. 15, 2019

(86) PCT No.: PCT/CN2019/100791
§ 371 (c)(1),
(2) Date: Feb. 15, 2022

(87) PCT Pub. No.: WO2021/026889
PCT Pub. Date: Feb. 18, 2021

(65) Prior Publication Data
US 2022/0295526 A1    Sep. 15, 2022

(51) Int. Cl.
*H04W 72/21*    (2023.01)
*H04W 72/1263*    (2023.01)
(Continued)

(52) U.S. Cl.
CPC ....... *H04W 72/21* (2023.01); *H04W 72/1263* (2013.01); *H04W 72/20* (2023.01); *H04W 72/543* (2023.01); *H04W 92/18* (2013.01)

(58) Field of Classification Search
None
See application file for complete search history.

(56) References Cited

U.S. PATENT DOCUMENTS

2011/0164587 A1*    7/2011 Seo ............... H04L 1/1825
                                                370/329
2016/0338021 A1*    11/2016 Chae ............. H04L 5/0048
(Continued)

FOREIGN PATENT DOCUMENTS

CN    104811892 A    7/2015
CN    106792430 A    5/2017
(Continued)

OTHER PUBLICATIONS

International Search Report of PCT/CN2019/100791 dated Apr. 26, 2020 with English translation, (4p).
(Continued)

*Primary Examiner* — Jeffrey M Rutkowski
*Assistant Examiner* — Mehedi S Aley
(74) *Attorney, Agent, or Firm* — Arch & Lake LLP

(57) ABSTRACT

A method for data transmission. The method includes: starting, by a terminal, a target timer corresponding to a target sidelink logical channel, determining a target resource based on whether resource configuration information transmitted by a base station is received before the target timer expires, wherein the resource configuration information is resource information of a first resource configured by the base station for the terminal, and the first resource is a resource configured to transmit target data to be transmitted on the target sidelink logical channel; and transmitting the target data on the target sidelink logical channel through the target resource.

9 Claims, 11 Drawing Sheets

(51) Int. Cl.
 H04W 72/20 (2023.01)
 H04W 72/543 (2023.01)
 H04W 92/18 (2009.01)

(56) References Cited

U.S. PATENT DOCUMENTS

| | | | |
|---|---|---|---|
| 2017/0171837 A1* | 6/2017 | Chen | H04W 72/20 |
| 2017/0238282 A1* | 8/2017 | Wei | H04W 72/04 |
| | | | 370/329 |
| 2017/0257803 A1 | 9/2017 | Tenny et al. | |
| 2017/0332189 A1 | 11/2017 | Gao et al. | |
| 2019/0053193 A1 | 2/2019 | Park et al. | |
| 2020/0059923 A1 | 2/2020 | Lei et al. | |
| 2020/0314869 A1* | 10/2020 | Xu | H04W 72/23 |

FOREIGN PATENT DOCUMENTS

| | | |
|---|---|---|
| CN | 107071916 A | 8/2017 |
| CN | 107079469 A | 8/2017 |
| CN | 107079530 A | 8/2017 |
| CN | 107371182 A | 11/2017 |
| CN | 108605253 A | 9/2018 |
| CN | 108811147 A | 11/2018 |
| CN | 108811157 A | 11/2018 |
| CN | 109246659 A | 1/2019 |
| CN | 109644460 A | 4/2019 |
| CN | 109792769 A | 5/2019 |
| EP | 3525539 A1 | 8/2019 |
| WO | 2016144893 A1 | 9/2016 |
| WO | 2019022470 A1 | 1/2019 |

OTHER PUBLICATIONS

The First CNOA issued in Application No. 201980001726.8 dated Aug. 2, 2022, with English translation, (18p).
Vice-Chairwoman (InterDigital), "Report from LTE Break-Out Session (V2V, V2X, FeD2D, LATRED)", 3GPP TSG-RAN WG2 Meeting #95, R2-167240, Kaohsiung, Oct. 10-14, 2016, (24p).

* cited by examiner

METHOD AND DEVICE FOR DATA TRANSMISSION

CROSS-REFERENCE TO RELATED APPLICATIONS

The present application is a U.S. National Phase of International Patent Application No. PCT/CN2019/100791 filed on Aug. 15, 2019, the entire content of which is incorporated herein by reference for all purposes.

TECHNICAL FIELD

The present disclosure relates to the field of communication technology, and particularly, to a method and device for data transmission.

BACKGROUND

A sidelink communication manner has been introduced in order to support direct communication between terminals. Currently, the sidelink communication manner includes two methods for data transmission:

a first method is that the transmission resource for the sidelink transmission of the terminal is dynamically scheduled by a network side; and a second method is that the transmission resource for sidelink communication is selected by a terminal in a resource pool broadcasted on the network side.

If the first method is used for sidelink communication, the terminal reports a sidelink BSR (Buffer Status Report) to the network side. After receiving the sidelink BSR, the network side transmits DCI (Downlink Control Information) to the terminal for indicating, through the DCI, the sidelink transmission resource that the terminal can use. If the terminal uses the second method for sidelink communication, the terminal may randomly select the transmission resource in the resource pool configured on the network side.

SUMMARY

The present disclosure provides a method and device for data transmission.

A first aspect of the present disclosure provides a method for data transmission, which is applied to a terminal, including: starting a target timer corresponding to a target sidelink logical channel, determining a target resource based on whether resource configuration information transmitted by a base station is received before the target timer expires, wherein the resource configuration information is resource information of a first resource configured by the base station for the terminal, and the first resource is a resource configured to transmit target data to be transmitted on the target sidelink logical channel; and transmitting the target data on the target sidelink logical channel through the target resource.

A second aspect of the present disclosure provides a method for data transmission, which is applied to a base station, including: configuring a first resource for a terminal based on a sidelink buffer status report reported by the terminal; and transmitting resource configuration information to the terminal, wherein the resource configuration information includes resource information of the first resource.

A third aspect of the present disclosure provides a data transmission device, which is applied to a terminal, including: a processor; and a memory storing processor-executable instructions, wherein the processor is configured to: starting a target timer corresponding to a target sidelink logical channel, determine a target resource based on whether resource configuration information transmitted by a base station is received before the target timer expires, wherein the resource configuration information is resource information of a first resource configured by the base station for the terminal, and the first resource is a resource configured to transmit target data to be transmitted on the target sidelink logical channel; and transmit the target data on the target sidelink logical channel through the target resource.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the specification, illustrate examples of the present disclosure, and together with the description, serve to explain the principle of the present disclosure.

DETAILED DESCRIPTION

Figure 1:
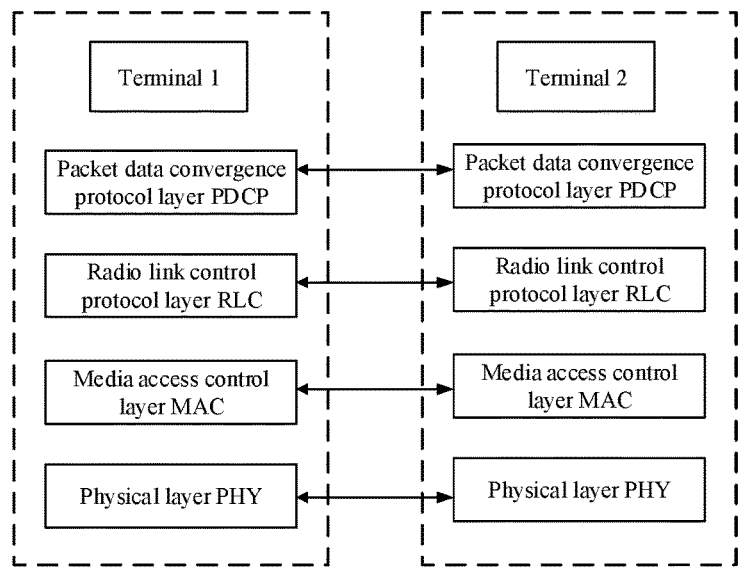
FIG. 1 is a schematic diagram of a sidelink protocol stack in the related art.

Embodiments will be described in detail herein, examples of which are illustrated in the accompanying drawings. When the following description refers to the drawings, the same numerals in different drawings refer to the same or similar elements unless otherwise indicated. The implementations described in the illustrative examples below are not intended to represent all implementations of the present disclosure. Rather, they are merely examples of devices and methods according to some aspects of the present disclosure as recited in the appended claims.

The terminology used in the present disclosure is for the purpose of describing particular embodiments only and is not intended to limit the present disclosure. As used in the present disclosure and the appended claims, the singular forms "a", "the" and "the" are intended to include the plural forms as well, unless the context clearly dictates otherwise. It will also be understood that the term "and/or" as used herein refers to and includes any and all possible combinations of one or more of the associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although the terms first, second, third and the like may be used in the present disclosure to describe various pieces of information, such information should not be limited by these terms. These terms are only used to distinguish the same type of information from each other. For example, first information may also be referred to as second information, and similarly, the second information may also be referred to as the first information, without departing from the scope of the present disclosure. Depending on the context, the word "if" as used herein may be interpreted as "at the time of" or "when" or "in response to determining".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows the protocol stack of the sidelink communication manner, and the interface between terminals is PC-5. The addressing of sidelink transmission is implemented through a source identifier and a target identifier of the MAC (Media Access Control) layer, and there is no need to establish a connection before transmission.

The sidelink communication manner may include two methods for data transmission:

a first method is that the transmission resource for the sidelink transmission of the terminal is dynamically scheduled by a network side; and a second method is that the transmission resource for sidelink communication is selected by a terminal in a resource pool broadcasted on the network side.

In some examples, even if the terminal uses the first sidelink communication method, the network side will pre-configure the terminal with an exceptional resource pool. When the terminal cannot obtain the transmission resource from the network side, it may select the sidelink transmission resource in the exceptional resource pool.

The terminal cannot obtain the transmission resource from the network side when the terminal detects that a radio link failure occurs on the Uu interface, before the terminal establishes an RRC (Radio Resource Control) connection with the network side, or when the terminal is in the process of handover. The Uu interface is an interface between the terminal and the network side.

In an NR (New Radio) system, when the terminal uses the above first direct sidelink communication method, it needs to transmit the sidelink BSR to the network side, and then the network side may schedule the sidelink transmission resource for the terminal. However, the terminal may have both the Uu BSR and the sidelink BSR, that is, the terminal may need to report the Uu BSR for communication with the network side and the sidelink BSR for sidelink communication with other terminals to the network side at the same time. Due to the limitation of uplink transmission resources, the terminal may only transmit the Uu BSR to the network side at one time, while the sidelink BSR may be transmitted to the network side until the next time the network side schedules the uplink resource for the terminal. The terminal may transmit the sidelink communication data until the network side configures the transmission resource for the terminal based on the sidelink BSR. This will cause a delay in the data transmission of the sidelink communication, and the quality of the sidelink service cannot be guaranteed.

Figure 2:
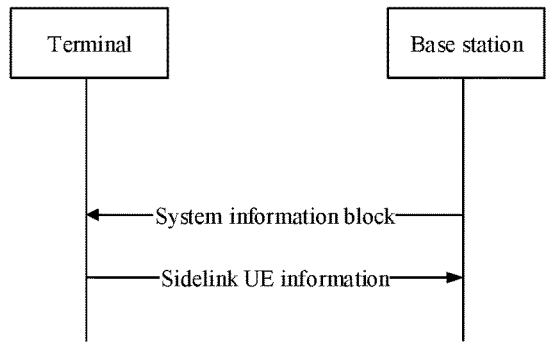
FIG. 2 is a schematic flowchart of exchanging sidelink terminal information between a terminal and a base station in the related art.

FIG. 2 shows the flowchart of exchanging sidelink terminal information between a terminal and a base station in the related art. A base station may transmit SIB (System Information Block) to a terminal, and the terminal transmits sidelink auxiliary information to a network side through sidelink UE information. The auxiliary information may include a terminal identification and whether the terminal is interested in sidelink transmission and/or reception.

After the base station receives the sidelink UE Information, if the terminal is interested in sidelink transmission and/or reception, the base station may dynamically schedule the sidelink transmission resource of the terminal. The sidelink resource used by the terminal when performing the sidelink communication multiplexes the wireless resource used by the terminal and the network side for uplink communication through the Uu interface. Therefore, the terminal may have both the Uu BSR and the sidelink BSR at the same time.

The terminal may only transmit the Uu BSR to the network side at one time, while the sidelink BSR may be transmitted to the network side until the next time the network side schedules the uplink resource for the terminal. The terminal may transmit the sidelink communication data until the network side configures the transmission resource for the terminal based on the sidelink BSR. This will cause a delay in the data transmission of the sidelink communication, and the quality of the sidelink service cannot be guaranteed.

In the NR system, the sidelink supports an enhanced V2X (vehicle to everything) service, and the Uu interface supports an URLLC (Ultra Reliable Low Latency Communication) service, which both need low latency and high reliability. In order to reduce the delay in sidelink data transmission and improve the service quality of the sidelink, examples of the present disclosure provide a method and device for data transmission.

A method for data transmission provided by an example of the present disclosure will be described firstly from a terminal side.

Figure 3:
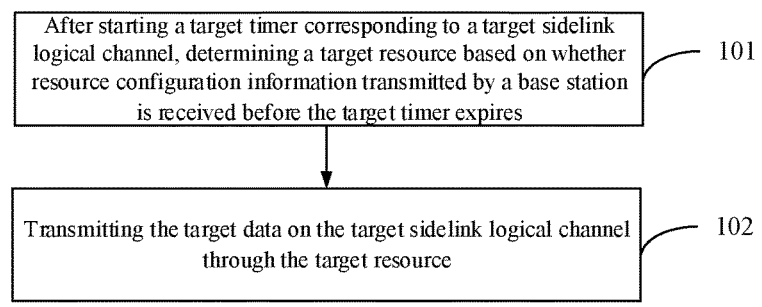
FIG. 3 is a schematic flowchart of a method for data transmission according to an example of the present disclosure.

FIG. 3 is a flowchart of a method for data transmission according to an example, which may be applied to a terminal. Optionally, the terminal may be a user's handheld device, such as a mobile phone, an ipad. Further, the terminal may be a sidelink smart device, such as a vehicle-mounted device, a smart meter. The method may include the following steps 101 and 102.

In step 101, after a target timer corresponding to a target sidelink logical channel is started, a target resource is determined based on whether resource configuration information transmitted by a base station is received before the target timer expires.

The resource configuration information is resource information of a first resource configured by the base station for the terminal, and the first resource is a resource configured to transmit target data to be transmitted on the target sidelink logical channel.

In step 102, the target data on the target sidelink logical channel is transmitted through the target resource.

In the above example, the terminal may determine the target resource based on whether the resource configuration information sent by the base station is received before the target timer expires, thereby transmitting the target data on the target sidelink logical channel through the target resource. Through the above process, the terminal may quickly determine the target resource for the sidelink communication, and transmit the target data through the target resource, thereby reducing the delay in the sidelink data transmission and improving the service quality of the sidelink.

Figure 4:
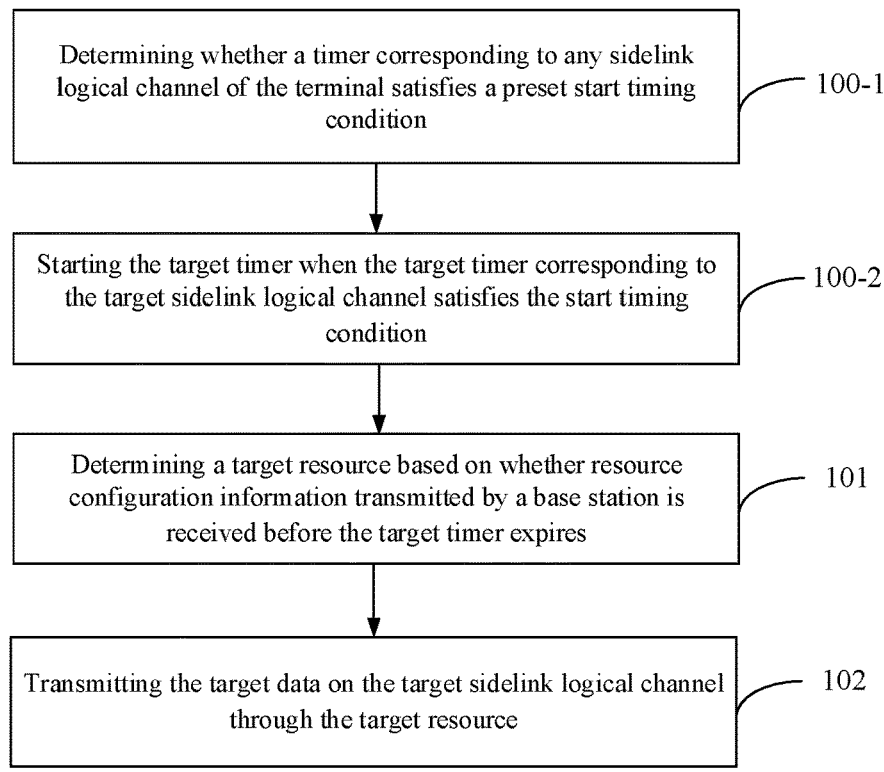
FIG. 4 is a schematic flowchart of another method for data transmission according to an example of the present disclosure.

In an example, FIG. 4 is a flowchart of another method for data transmission according to the example shown in FIG. 3, and as shown in FIG. 4, the method further includes:

step 100-1, determining whether a timer corresponding to any sidelink logical channel of the terminal satisfies a preset start timing condition; and step 100-2, starting the target timer when the target timer corresponding to the target sidelink logical channel satisfies the start timing condition.

In the above example, the terminal may first determine whether the timer corresponding to any sidelink logical channel satisfies the preset start timing condition and start the target timer when the target timer corresponding to the target sidelink logical channel satisfies the start timing condition, so as to determine the target resource based on whether the resource configuration information transmitted by the base station is received before the target timer expires, thereby reducing the delay in the sidelink data transmission and having high availability.

In an example of the present disclosure, the start timing condition includes any one of: that the target sidelink logical channel has a sidelink buffer status report that needs to be transmitted to the base station; and that the target data transmitted by a higher layer to the target sidelink logical channel is received.

In an example of the present disclosure, when there is a sidelink buffer status report that needs to be reported to the base station in any sidelink logical channel of the terminal, the terminal may determine that the sidelink logical channel is the target sidelink logical channel and that the target timer corresponding to the target sidelink logical channel satisfies the preset start timing condition.

Optionally, when a sidelink logical channel receives the target data transmitted by the higher layer such as an application layer, an RRC layer of the terminal, the terminal may determine that the sidelink logical channel is the target sidelink logical channel and that the target timer corresponding to the target sidelink logical channel satisfies the preset start timing condition.

In the above example, the start timing condition may include that the target sidelink logical channel of the terminal has the sidelink buffer status report that needs to be transmitted to the base station, or that the target sidelink logical channel receives the target data transmitted by the higher layer of the terminal. When any one of the conditions is satisfied, the terminal may start the target timer corresponding to the target sidelink logical channel, so as to determine the target resource based on whether the resource configuration information transmitted by the base station is received, thereby reducing the delay in the sidelink data transmission and improving the service quality of the sidelink.

In an example, step 101 may include:

step 101-1, before the target timer expires, using the first resource indicated by the resource configuration information as the target resource if the resource configuration information is received.

For example, if the duration of the target timer is 5 milliseconds, and the terminal receives the resource configuration information transmitted by the base station within 5 milliseconds, the terminal directly uses the first resource indicated by the resource configuration information as the target resource. Subsequently, the target data on the target sidelink logical channel is transmitted through the target resource.

In the above example, if the terminal receives the resource configuration information transmitted by the base station before the target timer expires, the terminal may directly use the first resource indicated by the resource configuration information as the target resource for transmitting the target data, which is easy to be implemented and has high availability.

Figure 5:
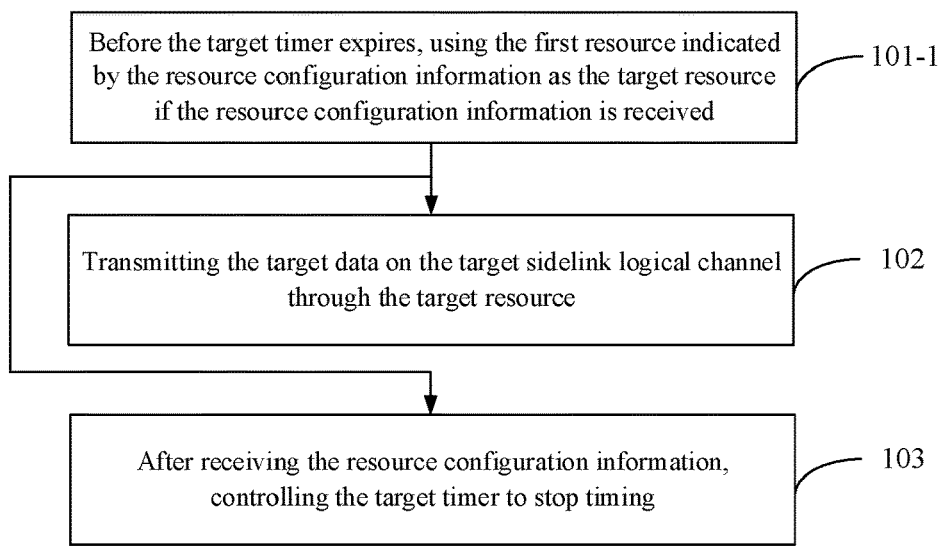
FIG. 5 is a schematic flowchart of another method for data transmission according to an example of the present disclosure.

In an example, FIG. 5 is a flowchart of another method for data transmission shown in the example shown in FIG. 3, and as shown in FIG. 5, the method may further include:

step 103, after receiving the resource configuration information, controlling the target timer to stop timing.

For example, the duration of the target timer is 5 milliseconds, the terminal receives the resource configuration information transmitted by the base station at the 4th millisecond, and at this time, the terminal may control the target timer to stop timing. The terminal may transmit the target data through the first resource as soon as possible to avoid the delay in the sidelink data transmission caused by that the terminal keeps on timing after receiving the first resource configured by the base station.

Figure 6:
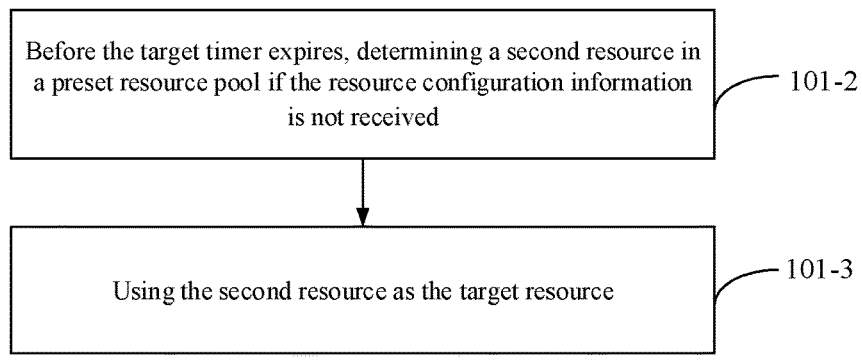
FIG. 6 is a schematic flowchart of another method for data transmission according to an example of the present disclosure.

In an example, FIG. 6 is a flowchart of another method for data transmission shown in the example shown in FIG. 3, and as shown in FIG. 6, step 101 may include step 101-2 and step 101-3.

In step 101-2, before the target timer expires, a second resource is determined in a preset resource pool if the resource configuration information is not received.

In an example of the present disclosure, the base station has pre-configured a preset resource pool for sidelink communication for the terminal, and if the terminal cannot obtain the resource scheduling from the base station, the terminal may use the resource in the preset resource pool for the sidelink communication. Optionally, the preset resource pool may be an exceptional resource pool.

Before the target timer expires, if the terminal has not received the resource configuration information, the terminal may directly determine the second resource in the preset resource pool.

In step 101-3, the second resource is used as the target resource.

In this step, the terminal may directly use the second resource determined from the preset resource pool as the target resource for transmitting the target data.

In the above example, if the terminal has not received the resource configuration information transmitted by the base station before the target timer expires, the terminal may directly determine the second resource in the preset resource pool. The preset resource pool is the sidelink resource pool which is pre-allocated by the base station to the terminal and used when the terminal can not obtain resource scheduling from the base station. The delay in the sidelink data transmission is reduced, and the service quality of the sidelink is improved.

Figure 7:
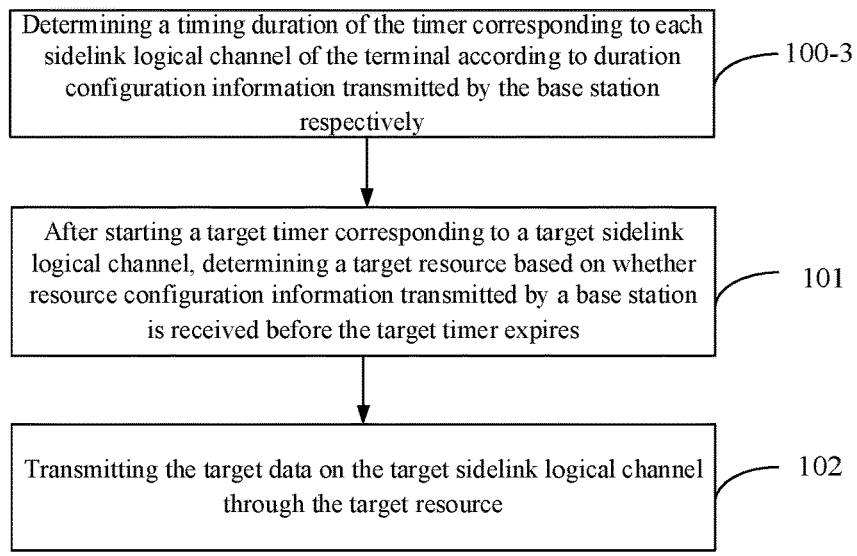
FIG. 7 is a schematic flowchart of another method for data transmission according to an example of the present disclosure.

In an example, FIG. 7 is a flowchart of another method for data transmission shown in the example shown in FIG. 3, and as shown in FIG. 7, before step 101, the method may further include:

step 100-3, respectively determining a timing duration of the timer corresponding to each sidelink logical channel of the terminal according to duration configuration information transmitted by the base station.

In an example of the present disclosure, the base station may configure the timing duration of the timer corresponding to each sidelink logical channel of the terminal for the terminal, and notify the terminal through the duration configuration information. Based on the received duration configuration information, the terminal determines the timing duration of a respective timer corresponding to each sidelink logical channel.

For example, according to the configuration information of the base station, the terminal determines that the timing duration of the timer 1 corresponding to the sidelink logical channel 1 is 5 milliseconds, and the timing duration of the timer 2 corresponding to the sidelink logical channel 2 is 6 milliseconds.

In an example of the present disclosure, the timing durations of the respective timers corresponding to the sidelink logical channels configured by the base station for the terminal may be the same or different, which is not limited in the present disclosure.

In the above example, before determining whether the start timing condition is satisfied, the terminal may respectively determine the timing duration of the timer corresponding to each sidelink logical channel of the terminal according to the duration configuration information transmitted by the base station, which has high availability.

Next, a method for data transmission provided by an example of the present disclosure will be introduced from a base station side.

Figure 8:
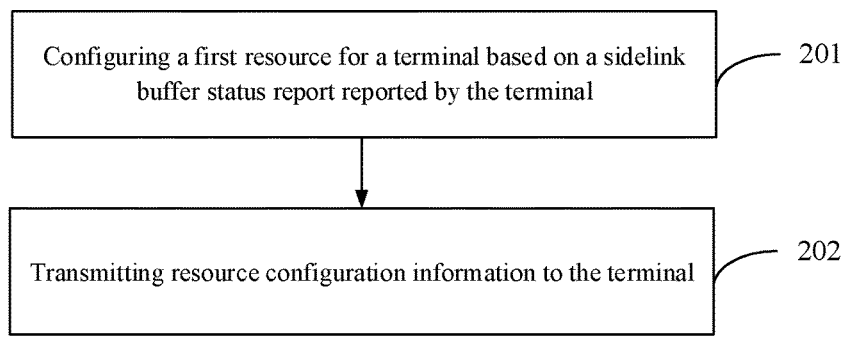
FIG. 8 is a schematic flowchart of another method for data transmission according to an example of the present disclosure.

FIG. 8 is a flowchart of another method for data transmission according to an example, which can be applied to a base station, and as shown in FIG. 8, the method may include the following steps 201 and 202.

In step 201, a first resource is configured for a terminal based on a sidelink buffer status report reported by the terminal.

In an example of the present disclosure, if the base station receives the sidelink buffer status report reported by the terminal, the base station configures the terminal with the first resource based on the sidelink buffer status report.

In step 202, the resource configuration information is transmitted to the terminal.

The resource configuration information includes resource information of the first resource.

The base station notifies the terminal of the resource information of the first resource through the resource configuration information. If the terminal receives the resource configuration information before the target timer expires, the terminal may use the first resource as the target resource and transmit the target data through the target resource.

Of course, if the terminal does not receive the resource configuration information before the target timer expires, the terminal may determine a second resource in a preset resource pool pre-configured by the base station for the terminal, use the second resource as the target resource, and transmit the target data through the target resource.

In the above example, the base station may configure the first resource for the terminal based on a sidelink buffer status report reported by the terminal, and transmit the same to the terminal through the resource configuration information. The terminal may determine the target resource based on whether the resource configuration information transmitted by the base station is received before the target timer expires, thereby transmitting the target data on the target sidelink logical channel through the target resource. Through the above process, the target resource for the sidelink communication may be quickly determined for the terminal, and the target data is transmitted through the target resource, thereby reducing the delay in the sidelink data transmission and improving the service quality of the sidelink.

Figure 9:
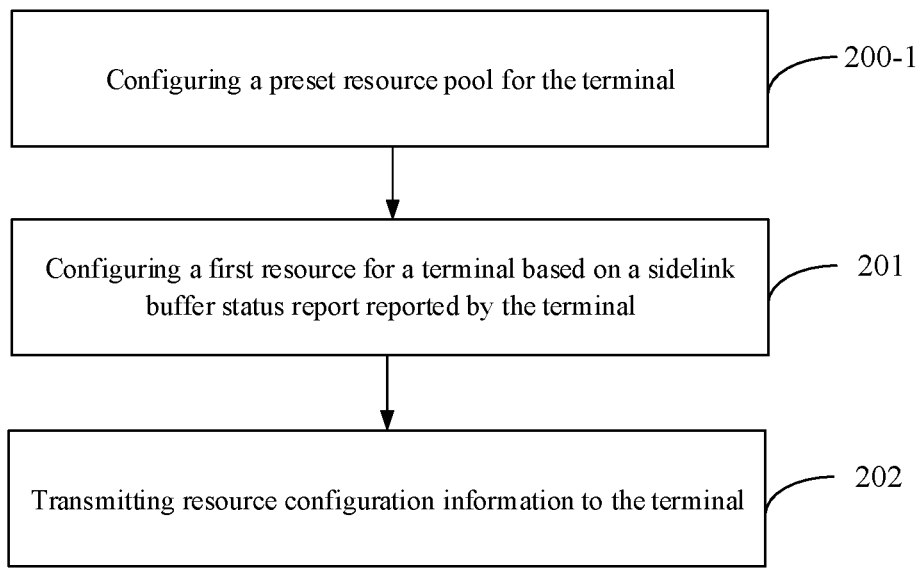
FIG. 9 is a schematic flowchart of another method for data transmission according to an example of the present disclosure.

In an example, FIG. 9 is a flowchart of another method for data transmission shown in the example shown in FIG. 8, and as shown in FIG. 9, before step 201, the method may further include:

step 200-1, configuring a preset resource pool for the terminal.

The preset resource pool is a sidelink resource pool which is allocated by the base station to the terminal and used when the terminal does not obtain resource scheduling from the base station.

In an example of the present disclosure, in addition to using the resource in the preset resource pool for sidelink communication when the terminal cannot obtain resource scheduling from the base station, the terminal may also use the second resource in the preset resource pool as the target resource for transmitting the target data if the resource configuration information transmitted by the base station is not received before the target timer expires, thereby reducing the delay caused by the terminal waiting for the first resource configured by the base station to transmit the target data.

Figure 10:
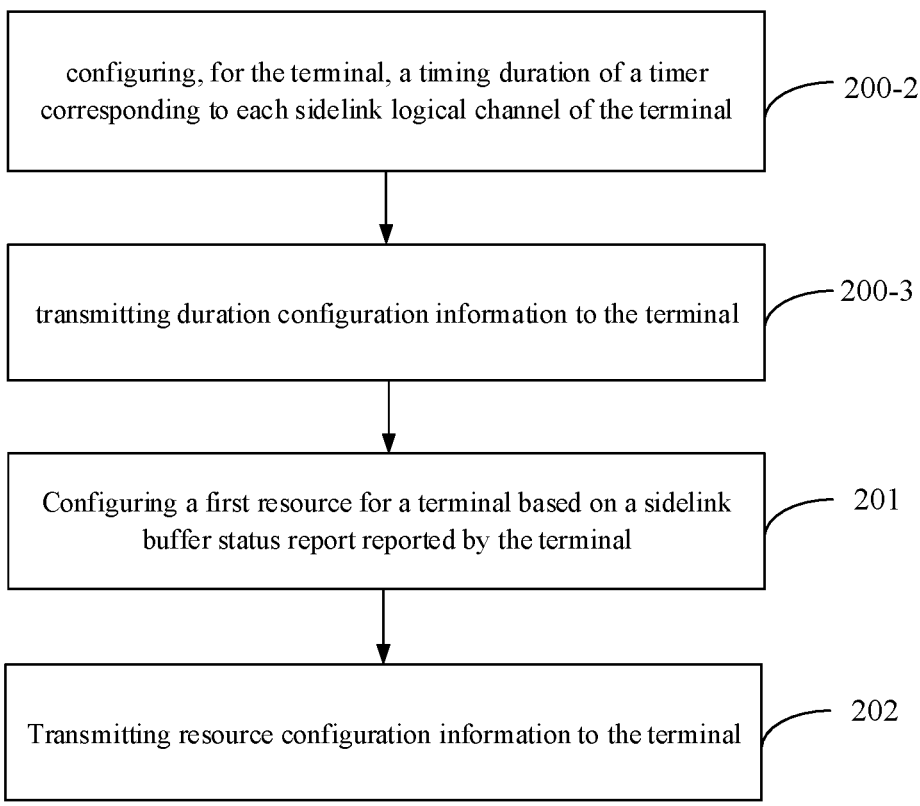
FIG. 10 is a schematic flowchart of another method for data transmission according to an example of the present disclosure.

In an example, FIG. 10 is a flowchart of another method for data transmission shown in the example shown in FIG. 9, and as shown in FIG. 10, before step 201, the method may further include steps 200-2 and 200-3.

In step 200-2, a timing duration of a timer corresponding to each sidelink logical channel of the terminal is configured for the terminal.

In this step, the base station may configure the timing durations of the respective timers for different sidelink logical channels based on services and channel qualities of the different sidelink logical channels of the terminal. Of course, the base station may also configure the timing durations of the respective timers for different sidelink logical channels based on other information, and the timing durations may be the same or different, which is not limited in the present disclosure.

For example, if the service corresponding to the sidelink logical channel 1 of the terminal requires low latency, the base station may configure a shorter timing duration for the timer 1 corresponding to the sidelink logical channel 1. If the channel quality corresponding to the sidelink logical channel 2 of the terminal is good, and the service corresponding to the sidelink logical channel 2 does not require high latency, but the amount of data is relatively large, the base station may configure a longer timing duration for the timer 1 corresponding to the sidelink logical channel 1.

In step 200-3, duration configuration information is transmitted to the terminal.

In this step, the base station may notify the terminal of the timing duration of the timer corresponding to each of the sidelink logical channels configured for the terminal through the duration configuration information, and the terminal determines the timing duration of the timer corresponding to each of the sidelink logical channels.

In the above example, the time duration of the timer corresponding to each of the sidelink logical channels may be configured by the base station for the terminal, which is easy to be implemented and has high availability.

Figure 11:
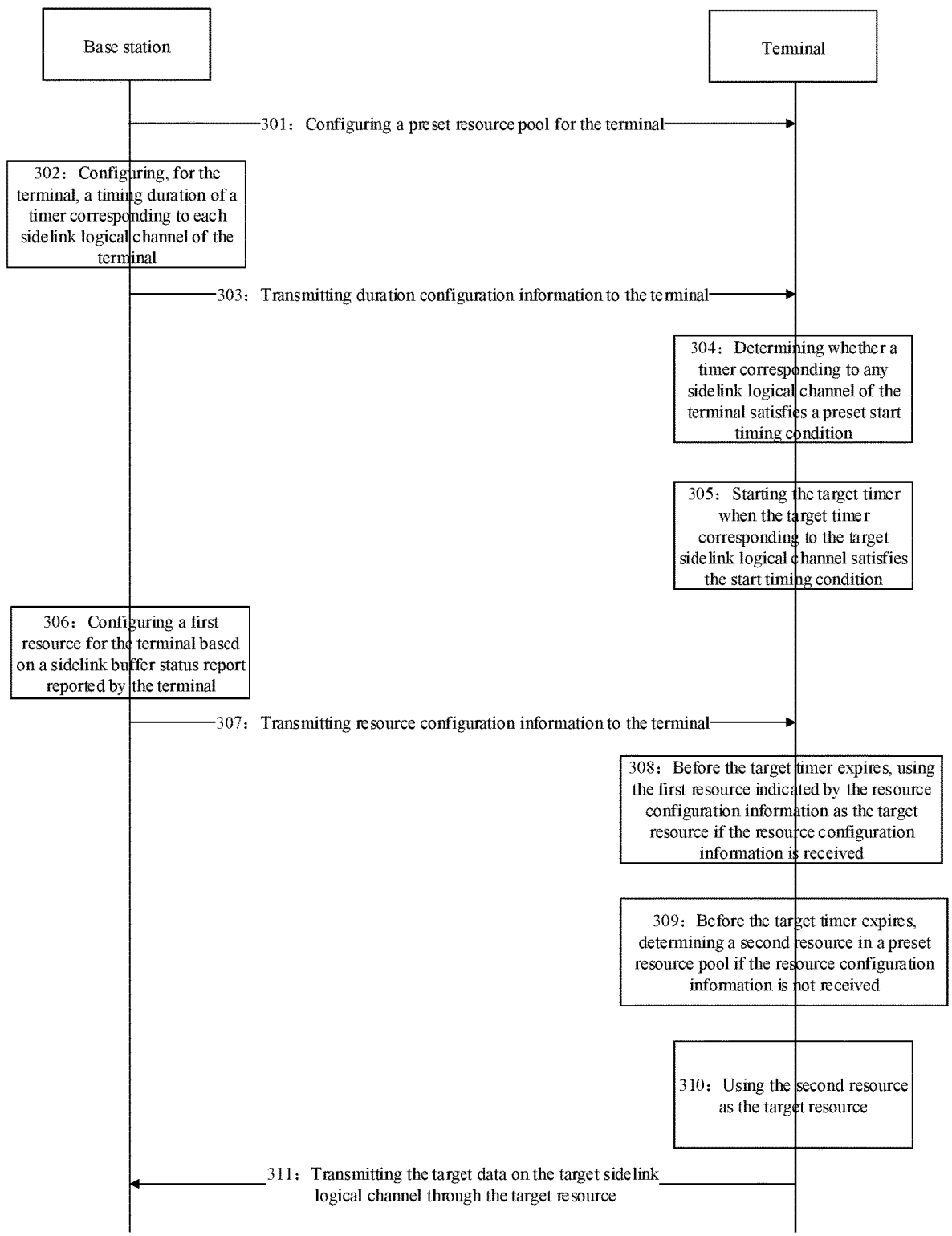
FIG. 11 is a schematic flowchart of another method for data transmission according to an example of the present disclosure.

In an example, FIG. 11 is a flowchart of another method for data transmission according to an example, and as shown in FIG. 11, the method may include the following steps 301 to 311.

In step 301, a base station configures a preset resource pool for a terminal.

The preset resource pool is a sidelink resource pool allocated by the base station to the terminal and used when the terminal cannot obtain resource scheduling from the base station. Optionally, the preset resource pool may be an exceptional resource pool.

In step 302, the base station configures a timing duration of a timer corresponding to each sidelink logical channel of the terminal for the terminal.

In step 303, the base station transmits duration configuration information to the terminal.

The duration configuration information includes the timing duration of the timer corresponding to each of the sidelink logical channels of the terminal.

In step 304, the terminal determines whether the timer corresponding to any sidelink logical channel of the terminal satisfies a preset start timing condition.

The start timing condition includes any one of: that the target sidelink logical channel has a sidelink buffer status report that needs to be transmitted to the base station; and that the target data transmitted by a higher layer to the target sidelink logical channel is received.

In step 305, the terminal starts the target timer when the target timer corresponding to the target sidelink logical channel satisfies the start timing condition.

In step 306, the base station configures a first resource for the terminal based on the sidelink buffer status report reported by the terminal.

The first resource is a resource used by the terminal to transmit the target data to be transmitted on the target sidelink logical channel.

In step 307, the base station transmits the resource configuration information to the terminal.

The resource configuration information includes resource information of the first resource.

In step 308, before the target timer expires, if the terminal receives the resource configuration information, the terminal uses the first resource indicated by the resource configuration information as the target resource.

In step 309, before the target timer expires, if the terminal does not receive the resource configuration information, the terminal determines a second resource in a preset resource pool.

In step 310, the terminal uses the second resource as the target resource.

In step 311, the terminal transmits the target data on the target sidelink logical channel through the target resource.

In the above example, if the terminal receives the resource configuration information transmitted by the base station before the target timer expires, the terminal takes the first resource indicated by the resource configuration information as the target resource. If the terminal does not receive the resource configuration information transmitted by the base station before the target timer expires, the terminal takes the second resource in the preset resource pool as the target resource. The target data on the target sidelink logical channel is transmitted through the target resource. The delay in the sidelink data transmission is reduced, and the service quality of the sidelink is improved.

The method for data transmission provided by the example of the present disclosure is further illustrated as follows.

For example, the terminal includes sidelink logical channels 1, 2 and 3, and the base station configures the time durations of the timers for the sidelink logical channel respectively, which are 4 milliseconds, 5 milliseconds and 6 milliseconds respectively.

If the sidelink logical channel 1 has a sidelink buffer status report that needs to be transmitted to the base station, the terminal starts a timer 1 corresponding to the sidelink logical channel 1, and the timing duration is 4 milliseconds.

If the terminal receives the resource configuration information transmitted by the base station within 4 milliseconds, the terminal transmits the target data on the sidelink logical channel 1 through the first resource indicated by the resource configuration information, and controls the timer corresponding to the sidelink logical channel 1 to stop timing.

For another example, the terminal includes sidelink logical channels 1, 2, and 3, and the base station respectively configures the time durations of the timers for the sidelink logical channels, which are 4 milliseconds, 5 milliseconds, and 6 milliseconds, respectively.

If the sidelink logical channel 1 has a sidelink buffer status report that needs to be transmitted to the base station, the terminal starts a timer 1 corresponding to the sidelink logical channel 1, and the timing duration is 4 milliseconds.

If the terminal does not receive the resource configuration information transmitted by the base station within 4 milliseconds, the terminal will transmit the target data on the sidelink logical channel 1 through the second resource in the preset resource pool.

For another example, the terminal includes sidelink logical channels 1, 2, and 3, and the base station respectively configures the time durations of the timers for the sidelink logical channels, which are 4 milliseconds, 5 milliseconds, and 6 milliseconds, respectively.

When the sidelink logical channel 1 receives the target data transmitted by the higher layer of the terminal, the terminal starts the timer 1 corresponding to the sidelink logical channel 1, and the timing duration is 4 milliseconds.

If the terminal receives the resource configuration information transmitted by the base station within 4 milliseconds, the terminal transmits the target data on the sidelink logical channel 1 through the first resource indicated by the resource configuration information, and controls the timer corresponding to the sidelink logical channel 1 to stop timing.

For another example, the terminal includes sidelink logical channels 1, 2 and 3, and the base station configures the timing durations of the timers for the sidelink logical channels respectively, which are 4 milliseconds, 5 milliseconds and 6 milliseconds respectively.

When the sidelink logical channel 1 receives the target data transmitted by the higher layer of the terminal, the terminal starts the timer 1 corresponding to the sidelink logical channel 1, and the timing duration is 4 milliseconds.

If the terminal does not receive the resource configuration information transmitted by the base station within 4 milliseconds, the terminal will transmit the target data on the sidelink logical channel 1 through the second resource in the preset resource pool.

Corresponding to the foregoing application function implementation method examples, the present disclosure further provides an example of an application function implementation device and a corresponding terminal.

Figure 12:
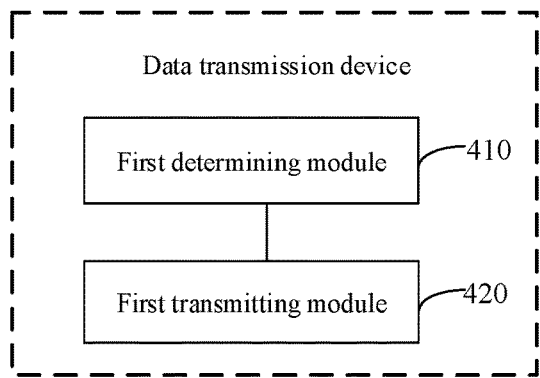
FIG. 12 is a block diagram of a device for data transmission according to an example of the present disclosure.

FIG. 12 is a block diagram of a device for data transmission according to an example, which is applied to a terminal, and as shown in FIG. 12, the device includes:

a first determining module 410, configured to, after a target timer corresponding to a target sidelink logical channel is started, determine a target resource based on whether resource configuration information transmitted by a base station is received before the target timer expires, wherein the resource configuration information is resource information of a first resource configured by the base station for the terminal, and the first resource is a resource configured to transmit target data to be transmitted on the target sidelink logical channel; and a first transmitting module 420, configured to transmit the target data on the target sidelink logical channel through the target resource.

Figure 13:
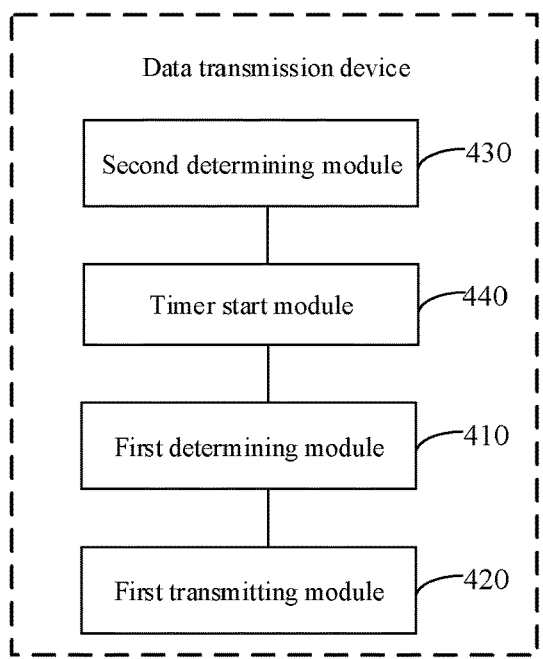
FIG. 13 is a block diagram of another device for data transmission according to an example of the present disclosure.

Optionally, FIG. 13 is a block diagram of another device for data transmission shown on the basis of the example shown in FIG. 12, and as shown in FIG. 13, the device further includes:

a second determining module 430, configured to determine whether a timer corresponding to any sidelink logical channel of the terminal satisfies a preset start timing condition; and a timer start module 440, configured to start the target timer in response to that the target timer corresponding to the target sidelink logical channel satisfies the start timing condition.

Optionally, the start timing condition includes any of:

that the target sidelink logical channel has a sidelink buffer status report that needs to be transmitted to the base station; and that the target data transmitted by a higher layer to the target sidelink logical channel is received.

Figure 14:
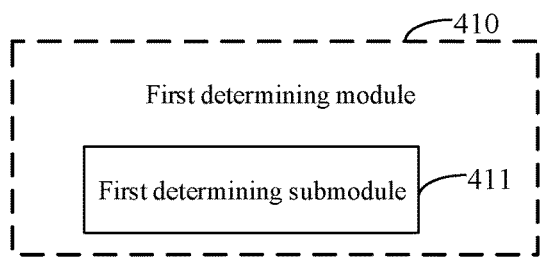
FIG. 14 is a block diagram of another device for data transmission according to an example of the present disclosure.

FIG. 14 is a block diagram of another device for data transmission shown on the basis of the example shown in FIG. 12, and as shown in FIG. 14, the first determining module 410 includes:

a first determining submodule 411, configured to, before the target timer expires, use the first resource indicated by the resource configuration information as the target resource in response to that the resource configuration information is received.

Figure 15:
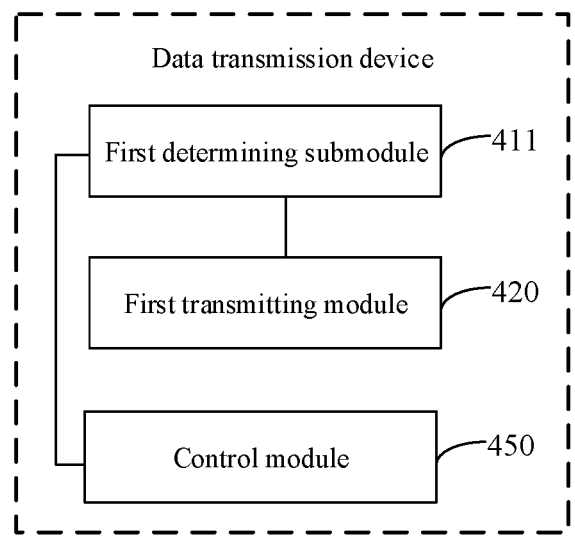
FIG. 15 is a block diagram of another device for data transmission according to an example of the present disclosure.

FIG. 15 is a block diagram of another device for data transmission shown on the basis of the example shown in FIG. 14, and as shown in FIG. 15, the device further includes:

a control module 450, configured to, after the resource configuration information is received, control the target timer to stop timing.

Figure 16:
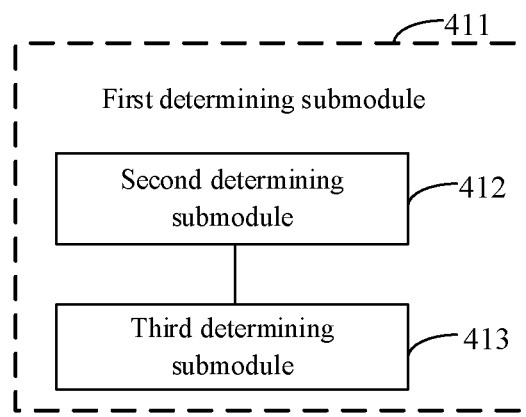
FIG. 16 is a block diagram of another device for data transmission according to an example of the present disclosure.

FIG. 16 is a block diagram of another device for data transmission shown on the basis of the example shown in FIG. 12, and as shown in FIG. 16, the first determining module 410 includes:

a second determining submodule 412, configured to, before the target timer expires, determine a second resource in a preset resource pool in response to that the resource configuration information is not received, wherein the preset resource pool is a sidelink resource pool which is pre-allocated by the base station to the terminal and used when the terminal does not obtain resource scheduling from the base station; and a third determining submodule 413, configured to use the second resource as the target resource.

Figure 17:
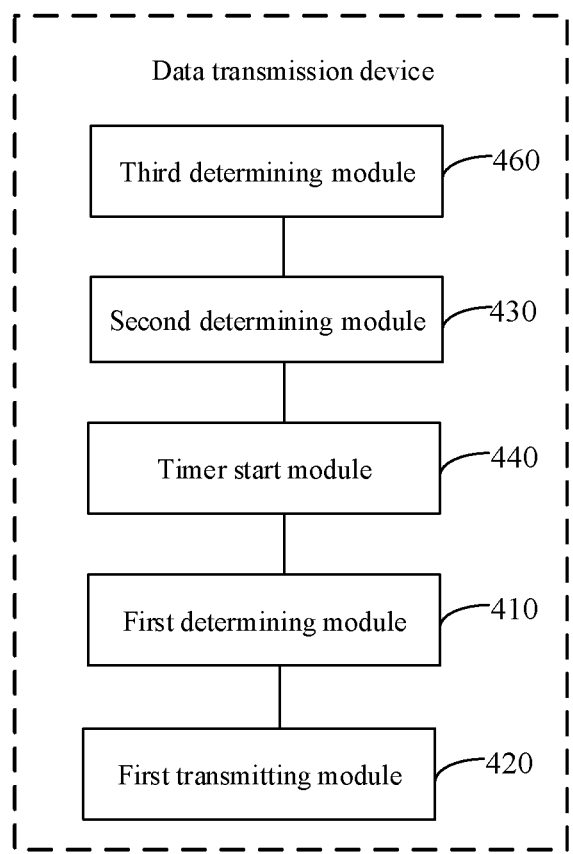
FIG. 17 is a block diagram of another device for data transmission according to an example of the present disclosure.

FIG. 17 is a block diagram of another device for data transmission shown on the basis of the example shown in FIG. 13, and as shown in FIG. 17, the device further includes:

a third determining module 460, configured to respectively determine a timing duration of the timer corresponding to each sidelink logical channel of the terminal according to duration configuration information transmitted by the base station.

Figure 18:
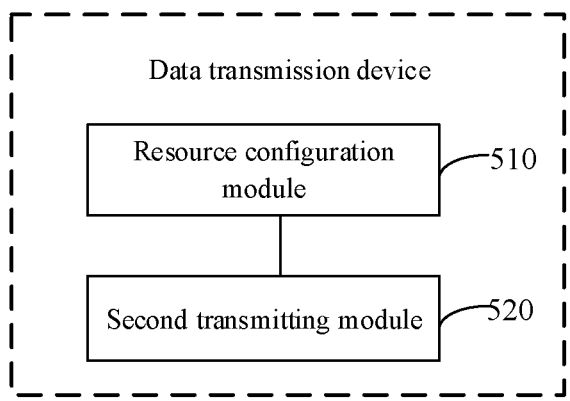
FIG. 18 is a block diagram of another device for data transmission according to an example of the present disclosure.

FIG. 18 is a block diagram of another device for data transmission according to an example, which is applied to a base station, and as shown in FIG. 18, the device includes:

a resource configuration module 510, configured to configure a first resource for a terminal based on a sidelink buffer status report reported by the terminal; and a second transmitting module 520, configured to transmit resource configuration information to the terminal, wherein the resource configuration information includes resource information of the first resource.

Figure 19:
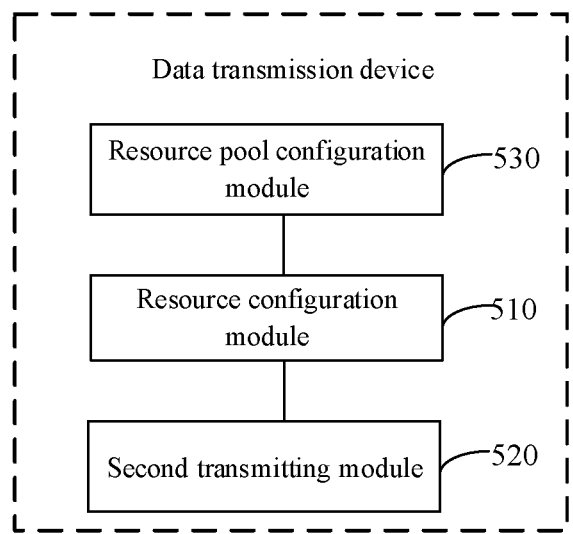
FIG. 19 is a block diagram of another device for data transmission according to an example of the present disclosure.

FIG. 19 is a block diagram of another device for data transmission shown on the basis of the example shown in FIG. 18, and as shown in FIG. 19, the device further includes:

a resource pool configuration module 530, configured to configure a preset resource pool for the terminal, wherein the preset resource pool is a sidelink resource pool which is allocated by the base station to the terminal and used when the terminal does not obtain resource scheduling from the base station.

Figure 20:
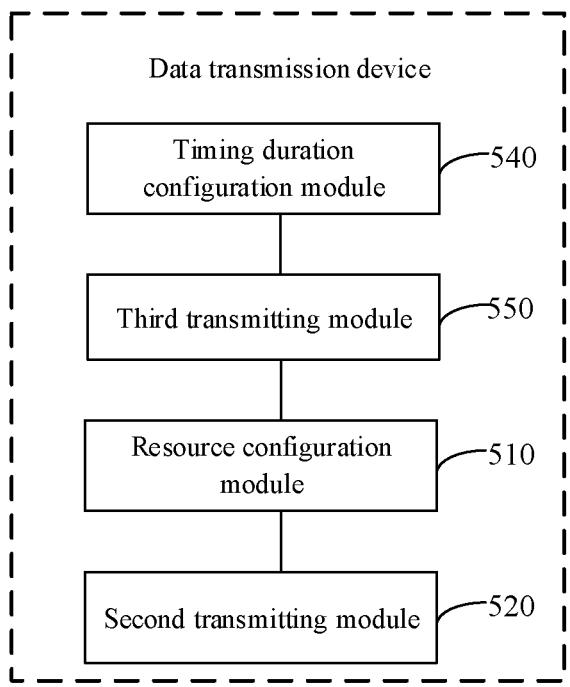
FIG. 20 is a block diagram of another device for data transmission according to an example of the present disclosure of the present disclosure.

FIG. 20 is a block diagram of another device for data transmission shown on the basis of the example shown in FIG. 18, and as shown in FIG. 20, the device further includes:

a timing duration configuration module 540, configured to configure, for the terminal, a timing duration of a timer corresponding to each sidelink logical channel of the terminal; and a third transmitting module 550, configured to transmit duration configuration information to the terminal, wherein the duration configuration information includes the timing duration of the timer corresponding to each sidelink logical channel of the terminal.

As the device examples basically correspond to the method examples, part of the description of the device examples may refer to corresponding description of the method examples. The device examples described above are only schematic. The above units described as separate components may or may not be physically separated, and the components shown as units may or may not be physical units, that is, they may be located in the same place, or may be distributed over a plurality of network units. Some or all of the modules may be selected according to actual needs to achieve the purpose of the solution of the present disclosure. Those skilled in the art may understand and implement the solution of the present disclosure without creative effort.

Correspondingly, the present disclosure also provides a computer-readable storage medium having a computer program stored thereon. The computer program is configured to execute any one of the aforementioned methods for data transmission for the terminal side.

Correspondingly, the present disclosure also provides a computer-readable storage medium having a computer program stored thereon. The computer program is configured to execute any one of the aforementioned methods for data transmission for the base station side.

Correspondingly, the present disclosure also provides a device for data transmission which is applied to a terminal, including:

a processor; and a memory storing processor-executable instructions, wherein the processor is configured to:

after starting a target timer corresponding to a target sidelink logical channel, determine a target resource based on whether resource configuration information transmitted by a base station is received before the target timer expires, wherein the resource configuration information is resource information of a first resource configured by the base station for the terminal, and the first resource is a resource configured to transmit target data to be transmitted on the target sidelink logical channel; and transmit the target data on the target sidelink logical channel through the target resource.

Figure 21:
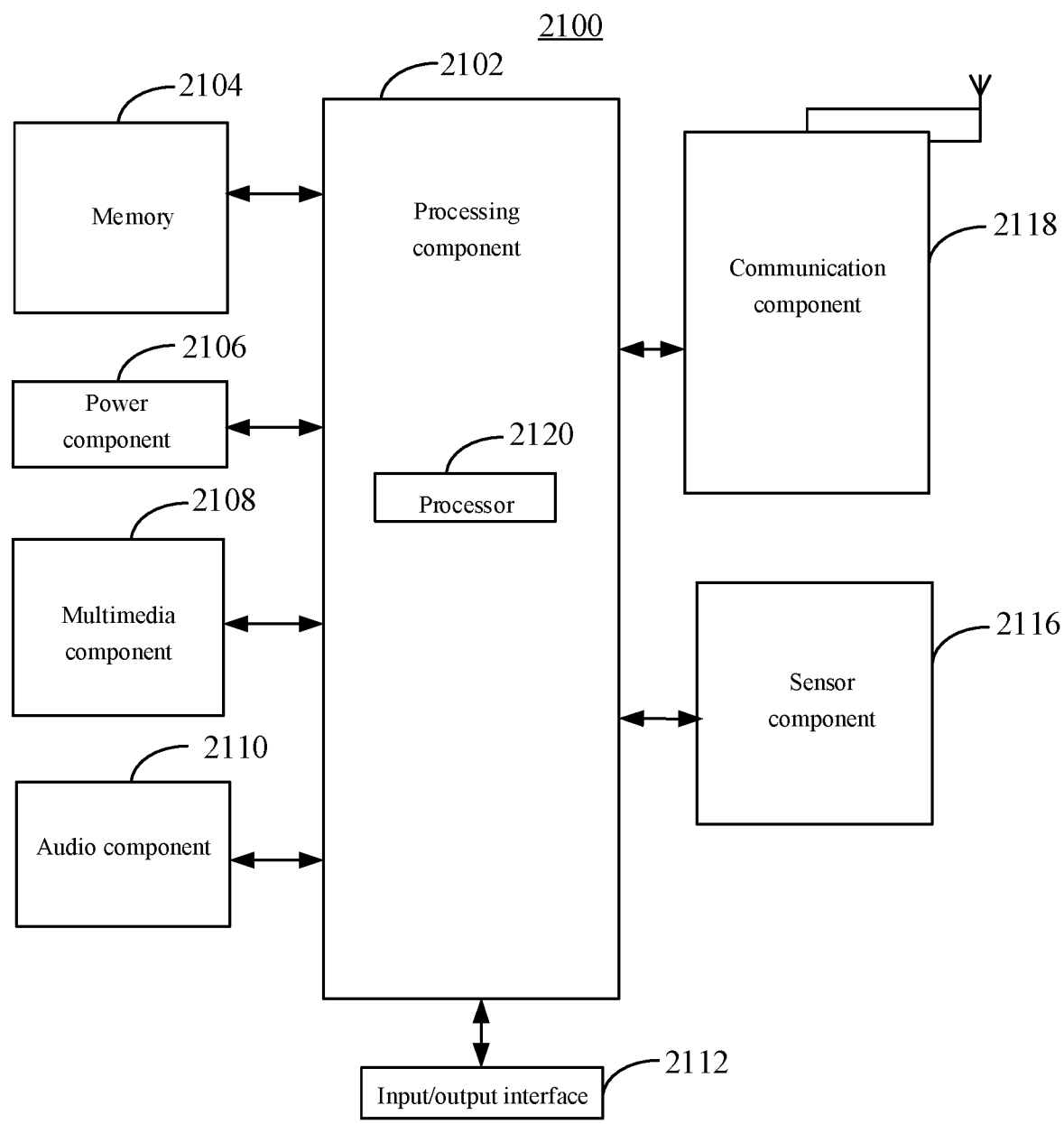
FIG. 21 is a schematic structural diagram of a device for data transmission according to an example of the present disclosure.

FIG. 21 is a block diagram of an electronic device 2100 according to an example. For example, the electronic device 2100 may be a terminal such as a mobile phone, a tablet computer, an e-book reader, a multimedia playback device, a wearable device, and a vehicle-mounted terminal.

Referring to FIG. 21, the electronic device 2100 may include one or more of: a processing component 2102, a memory 2104, a power component 2106, a multimedia component 2108, an audio component 2110, an input/output (I/O) interface 2112, a sensor component 2116, and communication component 2118.

The processing component 2102 generally controls the overall operation of the electronic device 2100, such as operations associated with display, phone calls, data communications, camera operations, and recording operations. The processing component 2102 may include one or more processors 2120 to execute instructions to perform all or some of the steps of the methods described above. Additionally, the processing component 2102 may include one or more modules that facilitate interaction between the processing component 2102 and other components. For example, the processing component 2102 may include a multimedia module to facilitate interaction between the multimedia component 2108 and the processing component 2102. For another example, the processing component 2102 may read executable instructions from the memory to implement the steps of the method for data transmission provided by the above examples.

The memory 2104 is configured to store various types of data to support operations at the electronic device 2100. Examples of such data include instructions for any application or method operating on the electronic device 2100, contact data, phonebook data, messages, pictures, videos, and the like. The memory 2104 may be implemented by any type of volatile or non-volatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 2106 provides power to various components of the electronic device 2100. The power component 2106 may include a power management system, one or more power supplies, and other components associated with generating, managing, and distributing power to the electronic device 2100.

The multimedia component 2108 includes a display screen that provides an output interface between the electronic device 2100 and the user. In some examples, the multimedia component 2108 includes a front-facing camera and/or a rear-facing camera. When the electronic device 2100 is in an operation mode, such as a shooting mode or a video mode, the front-facing camera and/or the rear-facing camera may receive external multimedia data. Each of the front-facing and rear-facing cameras may be a fixed optical lens system or have focal length and optical zoom capability.

The audio component 2110 is configured to output and/or input audio signals. For example, the audio component 2110 includes a microphone (MIC) that is configured to receive external audio signals when the electronic device 2100 is in operating modes, such as calling mode, recording mode, and voice recognition mode. The received audio signal may be further stored in the memory 2104 or transmitted via the communication component 2118. In some examples, the audio component 2110 also includes a speaker for outputting audio signals.

The I/O interface 2112 provides an interface between the processing component 2102 and a peripheral interface module, which may be a keyboard, a click wheel, a button, or the like. The button may include, but are not limited to a home button, a volume button, a start button, and a lock button.

The sensor component 2116 includes one or more sensors for providing status assessment of various aspects of the electronic device 2100. For example, the sensor component 2116 may detect opening/closing state of the electronic device 2100 and relative positioning of components such as the display and the keypad of the electronic device 2100.

The sensor component 2116 may also detect a change in position of the electronic device 2100 or a component of the electronic device 2100, presence or absence of the contact of the user with the electronic device 2100, orientation or acceleration/deceleration of the electronic device 2100 and a change in the temperature of the electronic device 2100. The sensor component 2116 may include a proximity sensor configured to detect the presence of a nearby object in the absence of any physical contact. The sensor component 2116 may also include a light sensor, such as a CMOS or CCD image sensor, for use in imaging applications. In some examples, the sensor component 21206 may also include an acceleration sensor, a gyroscope sensor, a magnetic sensor, a pressure sensor, or a temperature sensor.

The communication component 2118 is configured for wired or wireless communication between the electronic device 2100 and other devices. The electronic device 2100 may access a wireless network based on a communication standard, such as Wi-Fi, 2G, 3G, 4G or 5G, or a combination thereof. In an example, the communication component 2118 receives broadcast signals or broadcast related information from an external broadcast management system via a broadcast channel.

In an example, the communication component 2118 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the electronic device 2100 may be implemented by one or more application specific integrated circuits (ASICs), digital signal processor (DSP), digital signal processing device (DSPD), programmable logic devices (PLD), field programmable gate array (FPGA), controller, microcontroller, microprocessor or other electronic elements to perform the above method.

In an example, a non-transitory machine-readable storage medium including instructions, such as a memory 2104 including instructions, is also provided, and the instructions may be executed by the processor 2120 of the electronic device 2100 to complete the above method for data transmission. For example, the non-transitory computer-readable storage medium may be ROM, random access memory (RAM), CD-ROM, magnetic tape, floppy disk, optical data storage device, and the like.

Correspondingly, the present disclosure also provides a data transmission device, which is applied to a base station, including:
a processor; and
a memory storing processor-executable instructions,
wherein the processor is configured to:
configure a first resource for a terminal based on a sidelink buffer status report reported by the terminal; and
transmit resource configuration information to the terminal, wherein the resource configuration information comprises resource information of the first resource.

Figure 22:
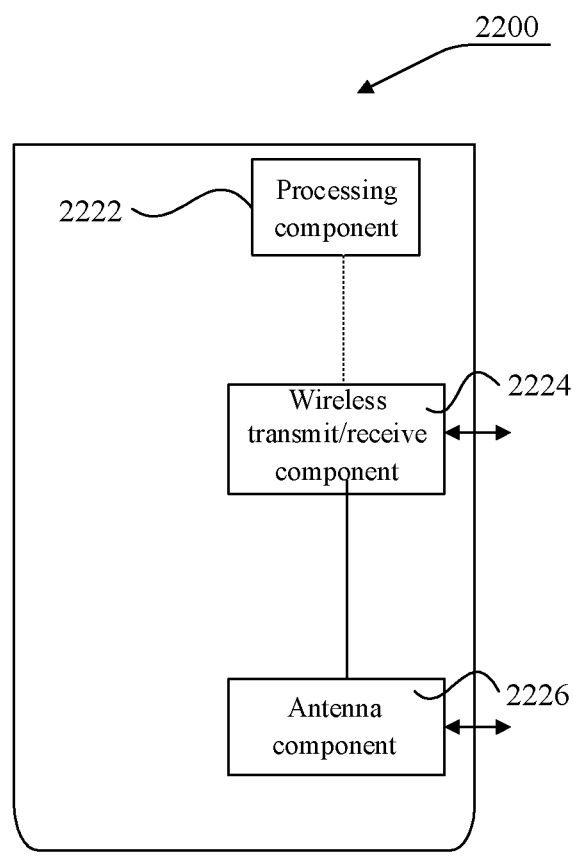
FIG. 22 is a schematic structural diagram of a device for data transmission according to an example of the present disclosure.

FIG. 22 is a schematic structural diagram of a device for data transmission 2200 according to an example. The device 2200 may be provided as a base station. As shown in FIG. 22, the device 2200 includes a processing component 2222, a wireless transmitting/receiving component 2224, an antenna component 2226, and a signal processing part specific to a wireless interface, and the processing component 2222 may further include one or more processors.

One of the processors in the processing component 2222 may be configured to perform any of the methods for data transmission described above.

Those skilled in the art may easily conceive of other examples of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and examples are to be regarded as only.

It is to be understood that the present disclosure is not limited to the precise structures described above and illustrated in the accompanying drawings, and that various modifications and changes may be made without departing from the scope thereof.

What is claimed is:

1. A method for data transmission, applied to a terminal, comprising:
    starting, by the terminal, a target timer corresponding to a target sidelink logical channel;
    determining, by the terminal, a target resource based on whether resource configuration information transmitted by a base station is received before the target timer expires, wherein the resource configuration information comprises resource information of a first resource configured by the base station for the terminal, and the first resource is configured to transmit target data to be transmitted on the target sidelink logical channel; and
    transmitting the target data on the target sidelink logical channel through the target resource,
    wherein starting, by the terminal, the target timer corresponding to the target sidelink logical channel, comprises:
        determining whether a timer corresponding to any sidelink logical channel of the terminal satisfies a preset start timing condition; and
        starting the target timer in response to that the target timer corresponding to the target sidelink logical channel satisfies the start timing condition,
    wherein the start timing condition comprises:
        the target sidelink logical channel comprises a sidelink buffer status report that needs to be transmitted to the base station; and
        the target data transmitted by an application layer to the target sidelink logical channel is received,
    wherein determining, by the terminal, the target resource based on whether the resource configuration information transmitted by the base station is received before the target timer expires, comprises:
        determining a second resource in a preset resource pool in response to not receiving the resource configuration information before the target timer expires, wherein the preset resource pool is a sidelink resource pool which is pre-allocated by the base station to the terminal and used when the terminal does not obtain resource scheduling from the base station; and
        using the second resource as the target resource.

2. The method according to claim 1, wherein determining the target resource based on whether the resource configuration information transmitted by the base station is received before the target timer expires, comprising:

using the first resource indicated by the resource configuration information as the target resource in response to receiving the resource configuration information before the target timer expires.

3. The method according to claim 2, further comprising: after receiving the resource configuration information, controlling the target timer to stop timing.

4. The method according to claim 1, further comprising: respectively determining a timing duration of the timer corresponding to each sidelink logical channel of the terminal according to duration configuration information transmitted by the base station.

5. A non-transitory computer-readable storage medium having a computer program stored thereon, wherein the computer program is configured to execute the data transmitting method according to claim 1.

6. A device for data transmission, applied to a terminal, comprising:
a processor; and
a memory storing processor-executable instructions,
wherein the processor is configured to:
start a target timer corresponding to a target sidelink logical channel;
determine a target resource based on whether resource configuration information transmitted by a base station is received before the target timer expires, wherein the resource configuration information comprises resource information of a first resource configured by the base station for the terminal, and the first resource is configured to transmit target data to be transmitted on the target sidelink logical channel; and
transmit the target data on the target sidelink logical channel through the target resource,
wherein starting the target timer corresponding to the target sidelink logical channel comprises:
determining whether a timer corresponding to any sidelink logical channel of the terminal satisfies a preset start timing condition; and
starting the target timer in response to that the target timer corresponding to the target sidelink logical channel satisfies the start timing condition, wherein the start timing condition comprises:
the target sidelink logical channel has a sidelink buffer status report that needs to be transmitted to the base station; and
the target data transmitted by an application layer to the target sidelink logical channel is received,
wherein determining the target resource based on whether the resource configuration information transmitted by the base station is received before the target timer expires, comprising:
determining a second resource in a preset resource pool in response to not receiving the resource configuration information before the target timer expires, wherein the preset resource pool is a sidelink resource pool which is pre-allocated by the base station to the terminal and used when the terminal does not obtain resource scheduling from the base station; and
using the second resource as the target resource.

7. The device according to claim 6, wherein determining the target resource based on whether the resource configuration information transmitted by the base station is received before the target timer expires, comprising:
using the first resource indicated by the resource configuration information as the target resource in response to receiving the resource configuration information before the target timer expires.

8. The device according to claim 7, wherein the processor is further configured to:
after receiving the resource configuration information, control the target timer to stop timing.

9. The device according to claim 6, wherein the processor is further configured to:
determine a timing duration of the timer corresponding to each sidelink logical channel of the terminal according to duration configuration information transmitted by the base station respectively.

* * * * *